United States Patent [19]

Mabie et al.

[11] Patent Number: 4,579,012

[45] Date of Patent: Apr. 1, 1986

[54] COMPACT ELECTROMECHANICAL ACTUATOR

[75] Inventors: John H. Mabie; Stephen P. Smith, both of Radford, Va.

[73] Assignee: Kollmorgen Technologies Corporation, Dallas, Tex.

[21] Appl. No.: 491,615

[22] Filed: May 4, 1983

[51] Int. Cl.⁴ ............................................. F16H 25/20
[52] U.S. Cl. ................................ 74/89.15; 74/424.8 R
[58] Field of Search ..................... 74/89.15, 424.8 R

[56] References Cited

U.S. PATENT DOCUMENTS

| | | | |
|---|---|---|---|
| 2,283,476 | 5/1942 | Waibel | 74/424.8 R |
| 2,307,317 | 1/1943 | Konig | 74/424.8 R |
| 2,444,886 | 7/1948 | Vickers | 74/424.8 R |
| 2,615,683 | 10/1952 | McCallum | 74/424.8 R |
| 2,799,872 | 7/1957 | Krahnke | 74/424.8 R |
| 2,806,383 | 9/1957 | Geyer | 74/424.8 R |
| 2,881,619 | 4/1959 | Fox et al. | 74/424.8 R |
| 2,966,070 | 12/1960 | Wise | 74/424.8 R |
| 3,147,631 | 9/1964 | Larsh | 74/424.8 R |
| 3,499,344 | 3/1970 | Pickles | 74/424.8 R |
| 4,346,728 | 8/1982 | Sulzer | 74/89.15 |

FOREIGN PATENT DOCUMENTS 44-15845  7/1969  Japan ............................ 74/424.8 R

OTHER PUBLICATIONS

"Electric Flight Systems", by Michael Cronin, NASA Conference Publication 2209, Jun. 9-10, 1981.

Primary Examiner—Lawrence J. Staar
Attorney, Agent, or Firm—Morgan, Finnegan, Pine, Foley & Lee

[57] ABSTRACT

A compact actuator is disclosed in which the motor, gear reduction and motion control functions are performed by an integral array of components. Instead of having separate interconnected units to perform these functions, the integral array compacts these functions into a single unit, allowing a reduction in the overall length and total weight of an actuator capable of a given output stroke and force.

4 Claims, 2 Drawing Figures

COMPACT ELECTROMECHANICAL ACTUATOR

BACKGROUND OF THE INVENTION

This invention relates to positioning apparatuses, and more particularly to a compact linear actuator.

Actuators are used in many types of applications to provide motion control. For example, actuators are used to rotate the elevators and rudder of an aircraft, and to raise the dump bed of a truck.

The nature of a particular application can impose severe restrictions on the size of the actuators that can be used to implement it. For example, in aircraft and spacecraft applications where weight and space is at a premium, actuators must be designed with an eye toward size. Often, however, an actuator designed to meet the space limitations of a particular application will be incapable of providing the output stroke and force required for that application.

SUMMARY OF THE INVENTION

Thus, a primary object of the present invention is to provide an actuator that can be used in confined areas without unacceptably limiting output stroke and force.

Another object of the present invention is to provide an actuator of compact, integral construction that can be used in confined areas without unacceptably limiting output stroke and force.

A further object of the present invention is to provide a compact electromechanical actuator having its motor, gear reduction and motion control components in an integral array so that it can be used in confined areas without unacceptably limiting output stroke and force.

The present invention is directed towards a compact electromechanical actuator in which the motor, gear reduction and motion control functions are performed by an integral array of components. Instead of having separate, interconnected units to perform these functions, the integral array compacts these functions into a single unit. Thus, rather than having a separate motor linked to a separate gear reduction unit, as in a typical actuator arrangement, in the present invention the motor and gear reduction unit are integrated by journaling the motor's shaft in the planet carrier of the planetary gear set comprising the gear reduction unit, and by machining the drive gear of the gear set as an integral part of the motor's shaft. Instead of using a separate motion control unit driven by a separate gear reduction unit, motion control, which is implemented through the linear translation of a linear member by a rotating cylindrical member, is also integrated into the array. The cylindrical member is machined as an integral part of the planet carrier, while the drive gear and shaft of the motor are both hollow to accommodate the linear member when it is contracted into the actuator.

The use of this integral array of components allows a reduction in the overall length and total weight of an actuator capable of a given force and output stroke and provides optimal support for the planetary gear set comprising the gear reduction unit.

DESCRIPTION OF THE PREFERRED EMBODIMENT

Figure 1:
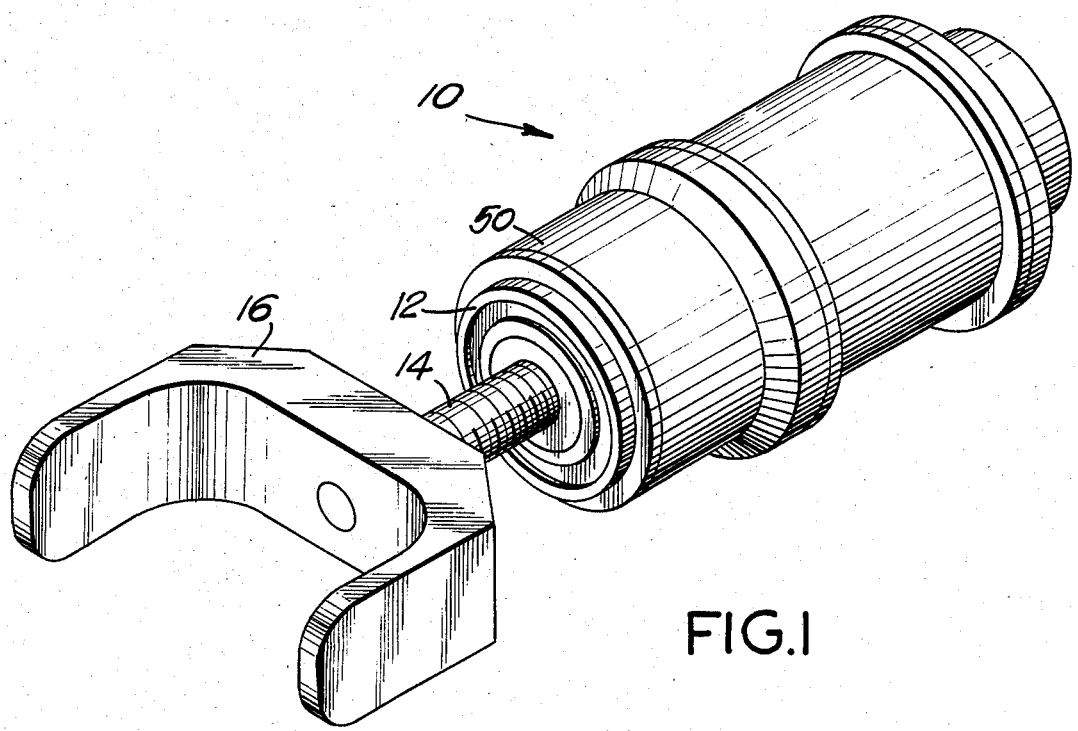
FIG. 1 is a perspective view of one embodiment of the compact linear actuator completely assembled and interfaced to a horse-shoe yoke used to control the rudder of an airplane.

FIG. 1 is a perspective view of one embodiment of the linear actuator of the present invention. In the embodiment shown, actuator housing 10 has a generally cylindrical shape which conforms to the generally cylindrical or circular shapes of its internal components. Protruding from one end 12 of the actuator is a roller (ball) screw 14 capable of linear translation. Screw 14 interfaces with the item to be moved or controlled by the actuator. In the embodiment shown in FIG. 1 it is attached to a horse-shoe yoke 16 which controls the upper rudder of an airplane. It should be noted, however, that the particular interface component to which screw 14 is attached will depend upon the particular application in which the actuator is used.

Figure 2:
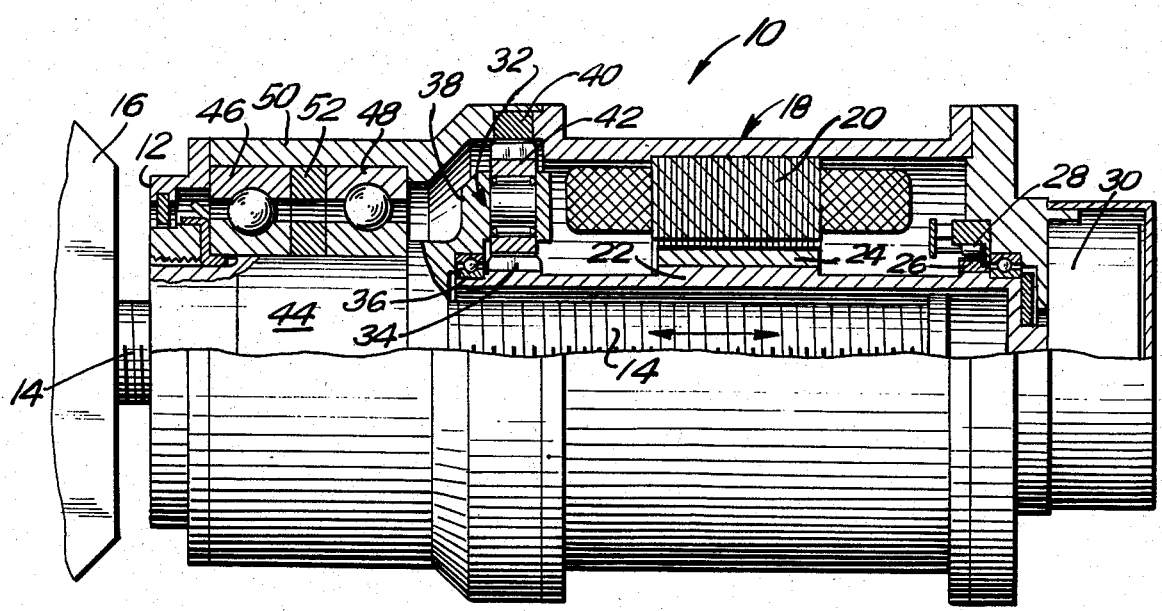
FIG. 2 is a partial cross-sectional view of the embodiment of the compact linear actuator shown in FIG. 1.

FIG. 2 shows a partial cross-sectional view of the embodiment of the actuator shown in FIG. 1 showing its component parts.

Operation of the actuator is initiated by the activation of a brushless DC motor 18 having a wound stator 20 and a rotor or shaft 22 with a fiberglass covered permanent magnet assembly 24 bonded thereto by an adhesive. It is to be understood, however, that other types of motors can also be used. Stator 20 is wound for three phase operation, however, other phase configurations, such as two phases, can also be used. A typical brushless motor controller (not shown) switches the fields applied to stator 20 for commutation control.

Also, bonded to shaft 22 is a second permanent magnet assembly 26 used to control the commutation of motor 18. For purposes of commutation control, a commutation position sensor 28 detects the angular position of the motor shaft by sensing the position of permanent magnet assembly 26. This data is used by the motor controller to properly time the switching of the motor field. In the preferred embodiment of the invention, this sensor is a bistable Hall device that changes state when moved in proximity to one of the permanent magnets of assembly 26.

The operation of motor 18, and the actuator in general, is controlled by means of a typical servo control system (not shown). A tachometer 30 senses the speed of shaft 22, and generates a speed-related signal which is fed to the servo system for control purposes.

The actuator achieves the specified mechanical output for a given application by gearing down the speed of motor shaft 22 through a gear reduction unit comprised of a planetary gear set 32. Motor 18 and gear set 32 are integrated first by machining a central, or sun, gear 34 to one end of motor shaft 22. Shaft 22 is then journaled on this same end using a torque tube bearing 36 within a planet carrier 38 of the planetary gear set. Surrounding gear 34 is a coaxial internal or ring gear 40 attached to housing 10. One or more intermediate pinions or planet gears 42 supported by planet carrier 38 are then meshed between coaxial gears 34 and 40.

Journaling of motor shaft 22 in the planet carrier allows the overall axial length and total weight of the actuator to be significantly reduced. Because this method of supporting the motor shaft replaces an end bell in which the motor shaft is normally journaled, the end bell is eliminated. Other advantages provided by this arrangement include minimum motor shaft deflection due to gear loading, since bearing 36 and sun gear 34 are adjacent one another, and close tolerance concentricity between the sun gear and the planet gears, since the planet carrier is also the housing for bearing 36.

Use of torque tube bearing 36 also allows a reduction in the diameter and weight of the actuator. Because a bearing of this type has a smaller cross-section for a given inside diameter than a regular bearing of comparable diameter, the components surrounding it can be reduced in size and weight accordingly.

During the operation of the actuator motor shaft 22 turns at a particular rate of speed. Since the sun gear is machined as part of this shaft, it turns at the same rate of speed. As this gear turns, it engages the planet gears, causing them to rotate in the opposite direction so that they travel around the sun gear on stationary ring gear 40. This traveling of the planet gears causes planet carrier 38 to turn in the same direction as the sun gear and the motor shaft, but at a lower rate of speed to increase the actuator's mechanical advantage.

The size of the gears comprising the planetary gear set is based upon the maximum torque that such gears will experience. The expected level of torque determines gear tooth size (diametral pitch), gear face width (overall length) and the material from which the gears are constructed. In the preferred embodiment this material is case hardened steel.

In the embodiment of the invention shown, the output force required for motion control is generated by the linear translation of a linear member. In the preferred embodiment this linear member is roller screw 14. Concentric with this screw is planet carrier 38, a portion 44 of which, machined as roller nut (or ball nut if screw 14 is a ball screw), engages and translates screw 14. This integral arrangement improves the stiffness of the actuator and allows the component which normally interconnects a separate planet carrier and a separate roller nut to be eliminated, so that the overall axial length of the actuator can be further reduced.

In operation, as planet carrier 38 is rotated by planet gears 42, the threads of its nut portion engage the threads of screw 14, causing it to translate so as to exert a linear force. The rate and direction of this translation is determined by the direction and rate of rotation of the planet carrier and the lead of screw 14. As the output shaft is rotated in one direction, screw 14 is caused to extend out of the actuator. Similarly, when the direction of rotation of the output shaft is reversed, screw 14 is caused to contract back into the actuator. To integrate screw 14 into the array components, sun gear 34 and motor shaft 22 both have hollow centers, thereby allowing the screw to translate into them as it is retracted. By telescoping screw 14 into the sun gear and motor shaft in its retracted position, a further reduction in the overall axial length of the actuator is achieved since no additional length is needed for screw 14's contraction.

The diameter of screw 14 must be such that it will be capable of withstanding the peak force that it will experience in operation. In addition, the lead of this screw must be sufficient for it to achieve the maximum no load speed required by the application in which the actuator is to be used. Lead determines the amount of torque required for nut portion 44 to produce the desired force on screw 14 and the distance that such screw will translate for each revolution of nut portion 44.

Planet carrier 38 is journaled within actuator housing 10 by means of a pair of angular contact ball bearings 46 and 48 that support ball nut portion 44 thereof. Other types of bearings, however, such as tapered roller bearings, may also be used. Bearings 46 and 48 are fitted into the same portion 50 of housing 10 as ring gear 40. This arrangement ensures the concentricity between the planet gears and the ring gear. Bearings 46 and 48, which are capable of withstanding high axial loads, are also separated by a spacer 52. During assembly of the actuator these bearings are pre-loaded to remove any free play that may exist in them. This also allows an increase in the stiffness of the actuator.

The characteristics of motor 18, i.e., peak torque and minimum no load speed, are determined by certain actuator design criterion. These criterion include the maximum output force to be exerted by screw 14, the maximum no load speed required of this screw, its lead and the overall dimensions of planetary gear set 32.

Thus, for any given application an actuator must be capable of generating a given maximum output force, and it must be capable of translating at a given no load maximum rate of speed. Given these constraints, for any application requiring an actuator to operate in a confined area, an actuator according to the present invention can be provided which will have a minimum of dimensions and weight without unacceptably limiting its output force and stroke capabilities.

The above-described embodiment of the invention is illustrative and modifications thereof may occur to those skilled in the art. The invention is not limited to the embodiment disclosed herein, but is to be limited only as defined by the appended claims.

We claim:
1. A compact actuator comprising:
   a housing,
   a planet carrier/nut journaled within said housing for rotation relative to said housing, said nut being an integral part of said planet carrier,
   a motor having a shaft with a hollow center, said shaft being journaled at one end in said housing and at the other end in said planet carrier/nut for rotation relative to said planet carrier/nut and said housing, said journaled ends comprising the sole support for said motor shaft,
   a sun gear having a hollow center, said sun gear being an integral part of said motor shaft, and being substantially adjacent said planet carrier/nut journal, said sun gear being positioned between said planet carrier/nut and said motor,
   a ring gear mounted within said housing, said ring gear being concentric with said sun gear,
   at least one planetary gear mounted on said planet carrier/nut, said at least one planetary gear cooperating with said sun gear and said ring gear to rotate said planet carrier/nut, and
   a screw interfaced with an item to be moved or controlled by the compact actuator, said screw being coaxial with said motor shaft, and being threaded within said planet carrier/nut so that rotation of said planet carrier/nut causes linear translation of said screw without and within said housing, said screw being accommodated within said hollow centers of said motor shaft and said sun gear when said screw is retracted within said housing by said planet carrier/nut.

2. A compact actuator as recited in claim 1 wherein said sun gear, said ring gear and said at least one planetary gear in combination comprise a planetary gear set.

3. A compact actuator as recited in claim 2 wherein said at least one planetary gear is comprised of a plurality of planetary gears cooperating with said sun gear and said ring gear to rotate said planet carrier/nut, and thereby, translate said screw within and without said housing.

4. A compact actuator as recited in claim 2 wherein said motor shaft is journaled in said planet carrier/nut using a torque tube bearing so that said gears comprising said planetary gear set are reduced in size and weight.

* * * * *